Dec. 30, 1941.    J. BARTHO ET AL    2,268,103
POWER STEERING MECHANISM FOR AUTOMOBILES
Filed Jan. 23, 1940    4 Sheets-Sheet 2
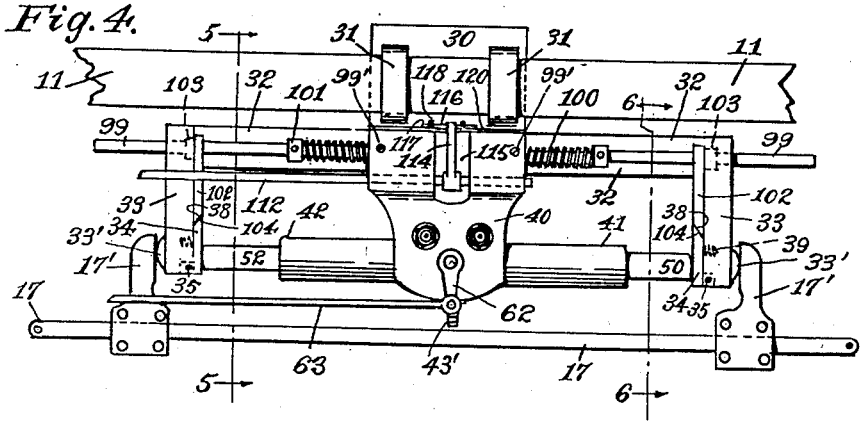
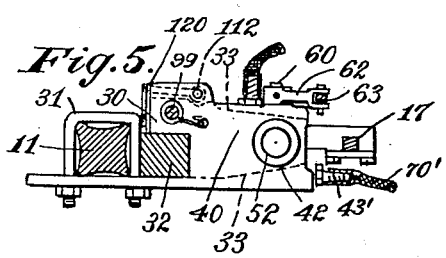
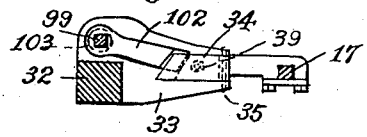
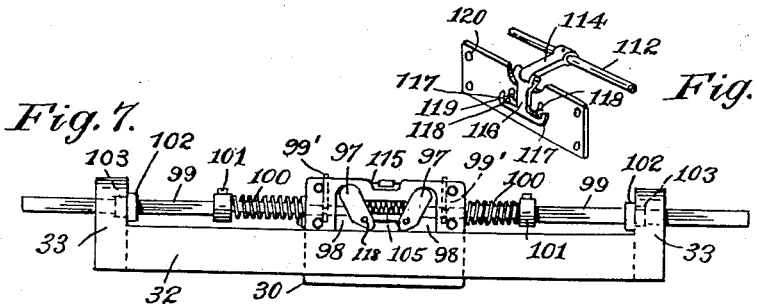
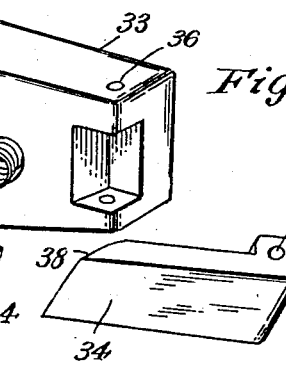
INVENTORS
John Bartho
BY John T. Ackerson
Edw. S. Higgins
ATTORNEY Dec. 30, 1941.   J. BARTHO ET AL   2,268,103
POWER STEERING MECHANISM FOR AUTOMOBILES
Filed Jan. 23, 1940   4 Sheets-Sheet 3
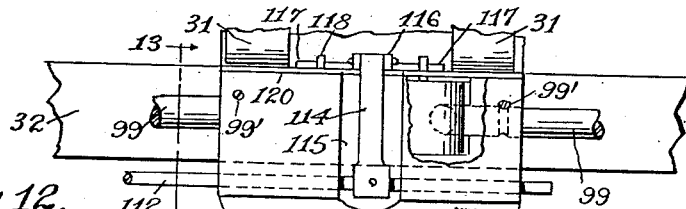
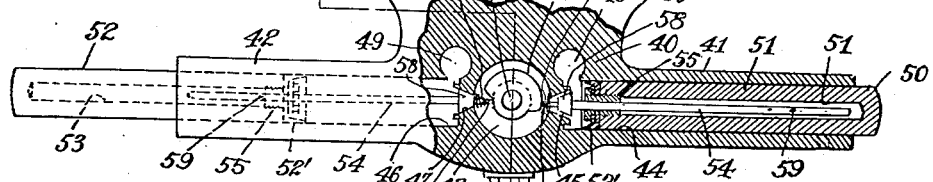
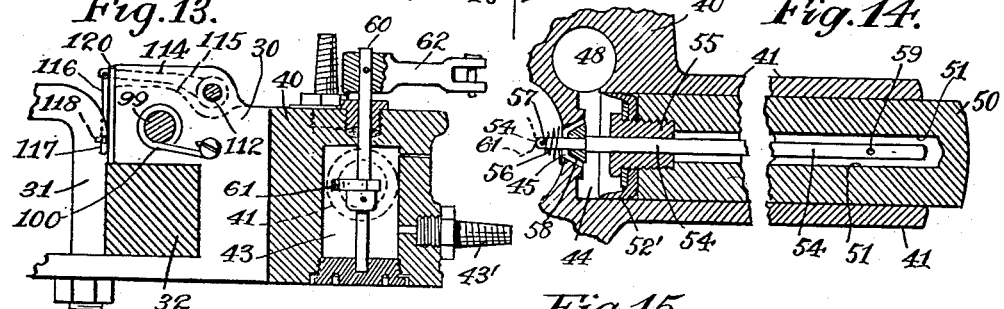
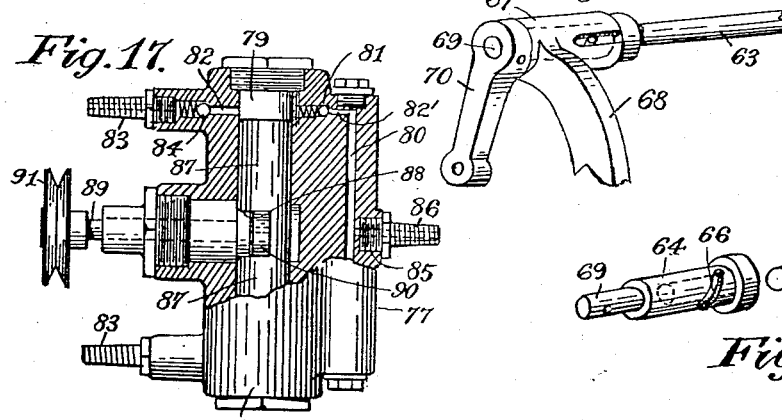
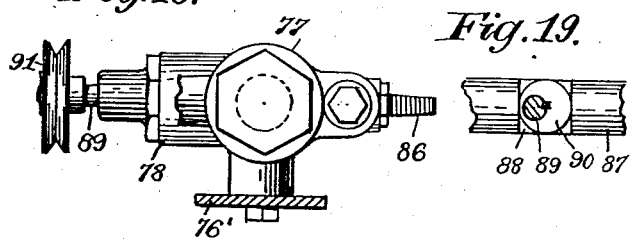
INVENTORS
John Bartho,
BY John T. Ackerson
Edw. S. Higgins
ATTORNEY Dec. 30, 1941.  J. BARTHO ET AL  2,268,103
POWER STEERING MECHANISM FOR AUTOMOBILES
Filed Jan. 23, 1940  4 Sheets-Sheet 4
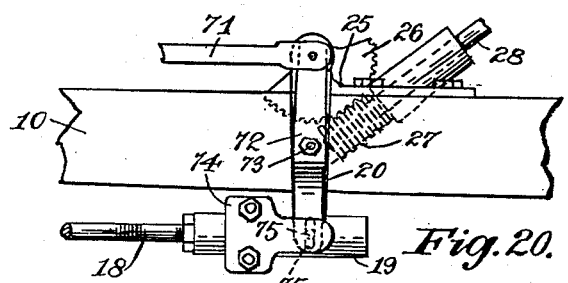
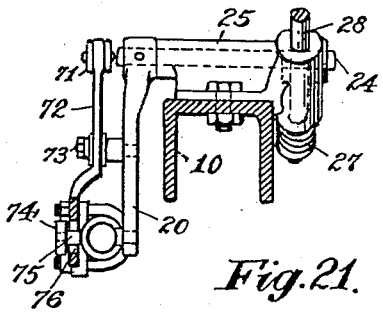
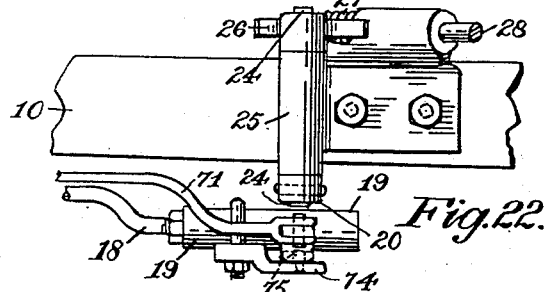
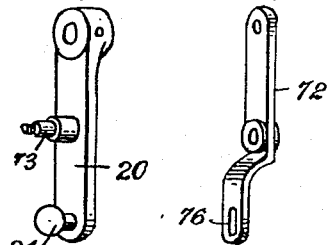
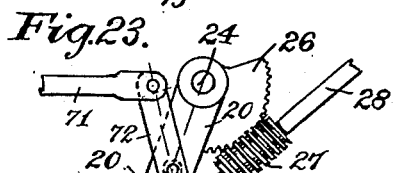
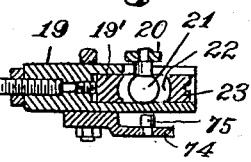
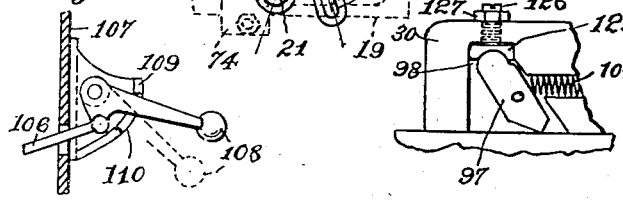
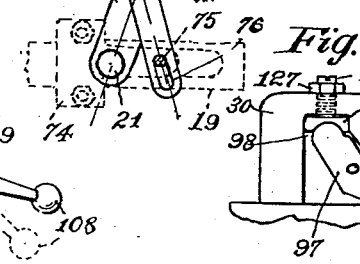
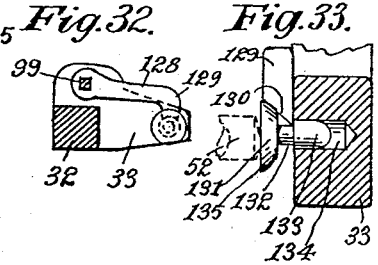
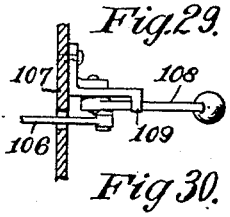
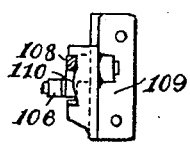
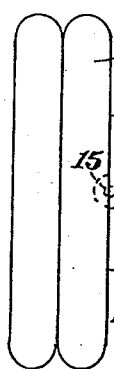
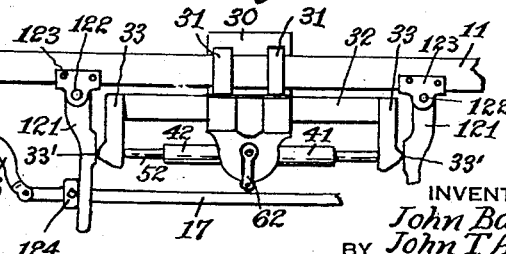
INVENTORS
John Bartho
BY John T. Ackerson
Edw. S. Higgin
ATTORNEY Patented Dec. 30, 1941

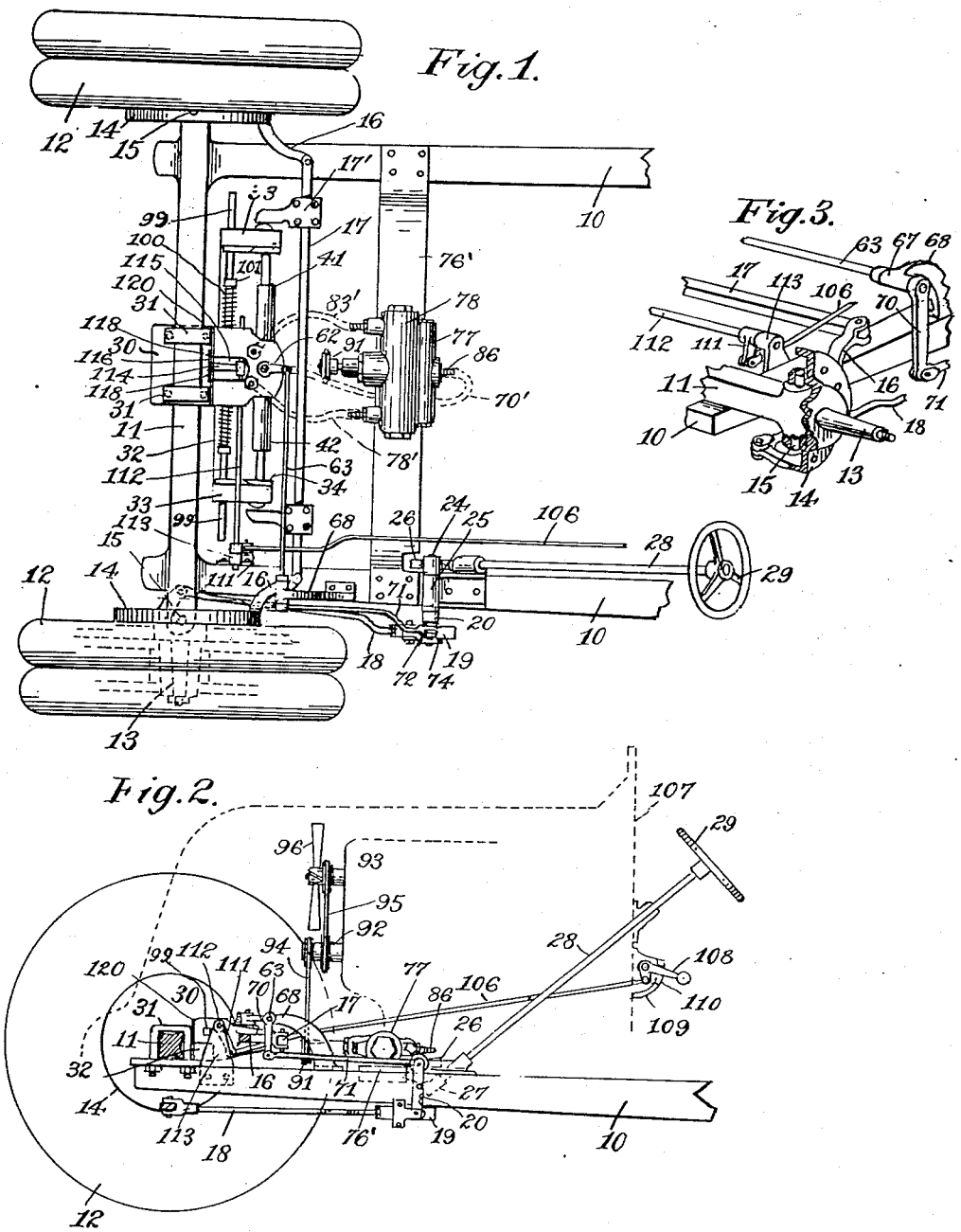

2,268,103

UNITED STATES PATENT OFFICE 2,268,103

POWER STEERING MECHANISM FOR AUTOMOBILES

John Bartho, Jackson Heights, N. Y., and John T. Ackerson, Fair Lawn, N. J.

Application January 23, 1940, Serial No. 315,246

14 Claims. (Cl. 180—79.2)

This invention relates generally to automobiles and more particularly to mechanism for power steering, for minimizing the effects of blow-outs and the like and for preventing and minimizing shocks and is an improvement over the invention disclosed in our Patent Number 2,219,645.

In power steering mechanism especially where hydraulic power is involved, much difficulty has been experienced because the liquid leaks from the system causing inefficiency in its operation and necessitating replenishing the system with liquid or providing some expedient such as a mechanical reserve or the like. Again in most of such systems, when the driver forgets to control the flow of the liquid a surplus pressure is liable to be built up resulting in damage to the system putting it out of operation. Again, in most of such systems when the automatic power steering mechanism gets out of order, the disorder must be remedied before the automobile can be steered as no provision is made for manual steering.

Furthermore, in most of such systems the driver loses "the feel of the road" and does not know whether the wheels are turning or not so far as his feeling is concerned.

It is an object of the present invention to permit an unlimited or surplus amount of liquid to be used in the system.

Another object is to prevent over-pressure from being built up in the system.

Another object is to operate the steering mechanism directly from the motor of the automobile.

Another object is to provide mechanism for steering automobiles that is easy to manipulate, is responsive to a minimum of manual effort and is positive in action.

Another object is to give the driver the "feel of the road" so as to afford peace of mind.

Another object is to resist shocks and to provide smooth riding.

Another object is to resist the injurious effects of blow-outs or other accidents.

Another object is to keep the steering mechanism always under control.

Referring to the drawings, Fig. 1 is a plan view of the front end of an automobile embodying the invention.

Fig. 2 is a side view thereof with the motor and part of the hood shown diagrammatically.

Fig. 3 is a detail view on an enlarged scale showing the connection between the front axle and the wheels, parts being shown in section.

Fig. 4 is a plan view on an enlarged scale of part of the steering mechanism.

Fig. 5 is a sectional view taken on the plane of the line 5—5 of Fig. 4.

Fig. 6 is a sectional view taken on the plane of the line 6—6 of Fig. 4.

Fig. 7 is a detail view showing the rocker shaft and brake shoes.

Fig. 8 is a perspective view of part of the mechanism for manually lifting the brake shoes off the sliding bar.

Figs. 9, 10 and 11 are perspective views showing the parts of the flange and latch members for preventing rocking movement of the rocker shaft shown in Fig. 7.

Fig. 17 is an enlarged detail view, partly in section, showing the cylinders and valve parts, with one of the pistons shown in extended operative position.

Fig. 13 is a sectional view taken on the plane of the line 13—13 of Fig. 12.

Fig. 14 is a longitudinal sectional view on an enlarged scale of a cylinder and piston showing the valve mechanism associated with the piston.

Fig. 15 is an enlarged detail view showing parts of the valve actuating mechanism.

Fig. 16 is a detail view on an enlarged scale showing the valve actuating rod.

Fig. 17 is an enlarged sectional view of the pump, parts being shown in elevation.

Fig. 18 is an enlarged end view of the pump shown in Fig. 17, parts being broken away.

Fig. 19 is a detail view showing part of the pump piston and actuating cam.

Figs. 20, 21 and 22 are side, end and top plan views, respectively, showing details of the connection between the lower end of the steering shaft and the drag link of the steering mechanism.

Fig. 23 is a detail view similar to Fig. 20 showing the relative position of the parts after the steering shaft has been moved in one direction to close the valve.

Fig. 24 is an enlarged perspective view of the pitman member of the steering mechanism, and Fig. 25 is an enlarged perspective view of its associated pivotal plate.

Fig. 26 is a sectional view of the socket member of the steering mechanism.

Fig. 27 is a side view of the socket shown in Fig. 26.

Figs. 28, 29 and 30 are side, edge and top plan views, respectively, of the bell crank lever and bracket which are part of the mechanism for placing the automatic braking mechanism out of operation to permit manual operation of the steering mechanism.

Fig. 31 is a detail view showing mechanism for adjusting a brake shoe and associated parts.

Fig. 32 is a side view and Fig. 33 an end view of a modified form of mechanism for preventing rocking of the rock shaft of the braking mechanism.

Fig. 34 is a plan view of part of the front of an automobile embodying a modified form of steering mechanism.

The invention is illustrated as used in connection with an automobile having an ordinary type of chassis including side frame members 10 and front axle 11. Front steering wheels 12 shown as of the double-wheel type are mounted on spindles 13 secured to the drum member 14, the drum member being pivotally mounted on the ends of the front axle by means of the pivot pin 15. Each drum member is rocked on its pivot pin by the knuckle member 16 which is connected to the end of the drag link being fastened to a tubular 18 is fastened to the drum member 14, the rear end of the drag link being fastened to a tubular socket member 19 which is connected to the pitman member 20. The connection between the socket 19 and pitman 20 comprises a ball member 21 on the pitman 20 extending into a slotted chamber 22 in the socket 19. The size of the recess or chamber 22 is adjusted by a nut 23 in the open end of the socket, and sufficient space is afforded around the ball 21 to permit it to move longitudinally of the socket 19. The upper end of the pitman is secured to one end of a shaft 24 mounted in a bracket 25 on the chassis frame, the other end of the shaft 24 mounting a gear segment 26 which is in mesh with the worm 27 on the lower end of the steering shaft or post 28. The usual hand wheel 29 is on the top of the steering post 28.

On the front axle at its middle, a casting or bracket 30 is secured by straps 31 or other suitable fastening means. Slidably mounted in this casting is a bar 32 shown square in cross section but which may be round if desired. At each end of the bar 32 is an inwardly extending flange member 33. On the outer end and inner surface of each flange a plate member 34 is hinged by means of a hinge pin 35 passing through openings 36 in the flange and an opening 37 in the plate 34. The free end of the plate 34 has a slanting outer edge 38 and this outer free end is urged away from the inner surface of the flange 33 by a spiral spring 39, one end of which seats in an opening in the inner surface of the flange and its other end impinges against the inner surface of the plate 34.

Formed integrally on the inner end of the casting 30 is a compression casing 40 and formed on each side of said casing 40 and in alignment are cylinders 41 and 42. In the center of the casing 40 is a liquid reservoir or sump 43 and leading from said sump 43 to the bore 44 of the cylinder 41 is a conical shaped passage 45 and leading to the bore 46 of the cylinder 42 is a similar passage 47. An inlet opening 48 extends from the exterior of the casing 40 to the bore 44 of cylinder 41, and a similar inlet opening 49 extends from the exterior of the casing 40 to the bore 46 of cylinder 42.

A piston member 50 is adapted to move in the bore 44 of cylinder 41 and outwardly of the cylinder casing. This piston is provided with an elongated axial opening or bore 51. A similar piston 52 with a similar opening 53 is adapted to move in the bore 46 of the cylinder 42. The inner end of each piston is closed by a leather dish-shaped washer member 52' which is held in position by a bushing member 55.

Associated with each of the pistons 50 and 52 is a valve device consisting of an elongated stem 54 which has one end extending through the conical passage adjacent the cylinder bore and projecting slightly into the sump 43 in the compression casing 40, the other end extending into the bore of the piston and passing through the bushing 55. On the portion of the stem projecting into the sump 43 is a spiral spring 56 with one end fastened to a cross pin 57 and its other end encircling the stem and seated against the inner wall of the sump 43 to urge the stem toward the sump. On the portion of the stem extending through the conical passage is a conical shaped valve member 58 which is adapted to seat against the wall of said conical passage to close the same. Adjacent the opposite end of the stem in the bore of the piston is a pin 59 adapted to be engaged by the bushing 55 to limit the outward movement of the piston.

Extending from the exterior of the compression casing 40 into and through the sump chamber 43 is a rock shaft 60 and mounted on said shaft on its portion within the sump chamber is a cam member 61. The working face of the cam is in alignment with and is adapted to engage the inner ends of the valve stems 54 and when the shaft is rocked said working face is adapted to be moved off of the end of one of said stems. Fastened to the outer end of the shaft 60 is a lever arm 62. Arm 62 is connected to one end of a link rod 63, the other end of the rod 63 being journalled in a sleeve member 64 and is provided with a pin 65 which moves in a curved slot 66 in the sleeve 64. The sleeve 64 is rotatably mounted in the sleeve portion 67 of a bracket 68 fastened to one of the side frames of the chassis. Sleeve 64 is provided with a cylindrical extension portion 69 and fastened to this extension is a lever arm 70. The bottom end of arm 70 is connected to one end of a link rod 71, the other end of which is connected to an arm 72 pivotally mounted on a pin 73 on the pitman 20. The lower end of the pivotal arm 72 is loosely connected to a plate member 74 on the tubular socket member 19 by means of a pin 75 on the plate extending through an elongated slot 76 in the bottom of the arm 72. The slot 76 is sufficiently long and wide to permit longitudinal and lateral movements of the socket member 19 relative to the arm 72 and thus permit the arm and socket member to assume angular positions relative to each other.

Mounted on a cross beam 76' near the tie rod 17 is a pump 77 (see Fig. 17) comprising a casing 78 having a central chamber 79 and communicating with said chamber 79 at each end thereof is a passage 80. At each end of the passage 80 is a spring pressed ball valve 81 which normally closes said passage. An outlet opening 82 leads from the chamber 79 at each end thereof to an outlet nozzle 83. In each opening outlet 82 a spring pressed ball valve 84 is positioned to normally close the same. An inlet opening 85 leads to the passage 80 and is provided with a nozzle 86. A piston or plunger 87 is movably mounted in the central chamber 79 and formed midway its length is a cut-away portion 88. Rotatably mounted in the pump casing is a shaft 89, the inner end of which supports an eccentric member 90 positioned in the cut-away portion 88. A pulley 91 is fastened to the outer end of the shaft 89. The pulley 91 is driven by the drive shaft 92 of the motor 93 of the automobile by means of a belt 94. Another belt 95 drives the cooling fan 96.

The present invention contemplates improved mechanism for minimizing the effects of a blow out or other accident. As is well known, when a tire is blown out or when a wheel meets with an obstruction, the front steering wheels and steering gear are jerked out of alignment and out of control of the driver. This usually means a movement of the tie rod to the right or left. In the present invention, mechanism has been provided for instantaneously resisting the sliding movement of the tie rod 17 by resisting the lateral movement of the slidable bar 32. This mechanism comprises brake shoes or cams 97 floatingly mounted in compartments 98 formed in the casing 30 above and adjacent the point where the sliding bar 32 passes therethrough. The upper end of each brake shoe is rounded to conform to the shape of the upper end of the compartment and its lower end or surface is slanted slightly. Each shoe is positioned sufficiently close to the slidable bar 32 so that when the shoe is in downward position, its slanting surface grips the bar 32 and holds it against sliding movement. The relative positions of the shoes and bar 32 and the shape of the lower surface of the shoes are such that when the shoe is in downward position it grips the bar 32 and any tendency of the bar 32 to move to the left as viewed in Figs. 4 to 7 will cause the bar to engage the slanting surface of the shoe 97 in the right hand compartment 98, the upper end of the shoe impinging against the upper wall of said compartment thereby causing a further gripping action between the shoe and bar. When the brake shoe in the left hand compartment 98 is in downward position, if the bar 32 moves to the right, said bar will engage the slanting lower surface of said brake shoe with the same gripping effect. It will thus be seen that the more the bar moves the harder it is gripped by the brake shoes, when the latter are in gripping or downward position.

Rockingly and slidably mounted in the flanges 33 of the sliding bar 32 and in the end walls of the casing 30 are aligned shafts 99, the outer end of each shaft extending outwardly beyond its supporting flange 33 and its inner free end extending inwardly of the end wall of the casing and into one of the compartments 98. The inner free end of each shaft has a slanting surface or face portion on the same slant as the outer surface of the brake shoe and is adapted normally to impinge against said brake shoe and hold it up off of the sliding bar 32. Shaft 99 has a groove for receiving pin 99' to hold the shaft against longitudinal movement. A spiral spring 100 encircles each shaft 99, one end thereof being fixed to the side wall of the casing 30 and the other end to a collar 101 on the shaft to hold the slanting surface of the inner free end of the shaft 99 against the brake shoe. The shafts 99 are square in cross section except where they pass through the walls of casing 30 at which points they are round to permit rocking. Fastened to each shaft 99 at a point adjacent its supporting flange 33 is a plate or arm 102 provided with a tubular hub portion 103 which extends through an opening in the flanges 33 whereby the arm 102 is adapted to be rocked with the shaft 99. Each arm 102 is also provided with a slanting outer surface portion or face 104 which is adapted to coact normally with the slanting face portion 38 of the plate 34 to prevent rocking of the shaft 99.

A strong spiral spring 105 is mounted between the brake shoes and is so disposed that it normally urges the shoes apart and when resistance is removed from said brake shoes, said spring moves the shoes downwardly into gripping position with the rod 32 with a snap action.

The braking mechanism operates as follows: When a blowout, for example, occurs, there is always a powerful jerk on the front steering wheels 12 either to the right or left as the case may be. Because these wheels are connected to the slidable bar 32, this jerking will be imparted to and will move said bar to the right or left at a much greater speed than the movement of the piston of either cylinder 41 or 42 with the result that the bar 32 with its attached flange 33 will move away from the adjacent piston and carry along with it the hinged plate 34 and pivotal plate or arm 102 and as soon as the hinge plate 34 moves free of the end of the piston 52, the spiral spring 39 will force said plate outwardly away from the flange 33 and away from the coacting surface of arm 102 thereby breaking the connection between the arms 34 and 102 and permitting the shaft 99 to rock. When the shaft 99 rocks, the slanting surface of its free inner end is moved away from the slanting surface of the adjacent brake shoe permitting said shoe to fall by gravity and in addition to be urged with a snap action by the spiral spring 105 into gripping engagement with the sliding bar 32, thus resisting any lateral movement of the bar 32. Thus it will be seen that the blow-out causes the front wheels 12 to move laterally carrying the slidable bar 32 laterally away from the piston head thus breaking the connection between the piston and arm 34 and permitting the spring to move said arm 34 away from arm 102 and thus automatically and instantaneously permitting the spiral spring 105 to come into play and snap the brake shoe downward to grip the slidable bar to resist any further movement laterally and thus resist the tendency of the front steering wheels 12 to move further out of alignment.

In operation when it is desired to steer the automobile to the right or left, the steering post 28 is turned slightly in the desired direction by the hand wheel 29. The pitman 20 and associated parts are normally in the position shown in Fig. 20. Movement of the steering post 28 is imparted to the pitman 20 through the worm 27, gear segment 26 and shaft 24. The pitman is rocked only sufficient to move its ball member 21 from the center of the recess 22 in the socket 19 as shown in Fig. 26 to the left to the concaved inner wall of the block 19' in the socket, or to the right to the concaved inner end of nut 23 as shown in Fig. 26. This movement of the ball end of pitman 20 imparts no movement to the drag link 18, the recess providing a lost motion connection between the pitman and drag link 18. Simultaneously however with the movement of the pitman 20, movement is imparted to the lever arm 72 which because of its pivotal connection to the pitman 20 at the point 73, and its fixed connection to the plate 74, causes it to move to the right or left of its neutral position of Fig. 20. If the hand wheel 29 is moved in one direction, the pitman will be moved to the right (see Fig. 23) of its neutral position of Fig. 20 only a sufficient distance to bring its ball 21 into engagement with the inner wall of the block 19' in the socket 19. The lever arm 72 will simultaneously have been moved to the left, the pitman and lever arm assuming the angular relative positions of Fig. 23. Movement of the lever arm 72 to the left as shown in Fig. 23 will of course move rod 71 to the left.

If the hand wheel 29 is moved in the opposite direction, the pitman will be moved to the left of its neutral position of Fig. 20 until the ball 21 engages the inner end of nut 23 and the lever arm 72 will simultaneously be moved to the right of its neutral position, with the pitman and lever arm assuming the reverse positions to that shown in Fig. 23 but keeping the same angular relationship.

Movement of the rod 71 to the right or left as viewed in Fig. 20 will immediately move lever arm 62 and rock shaft 60 and its cam 61 to the right or left as viewed in Fig. 12. Movement of the cam 61 to the right will move its working face off of the end of stem 54 and permit spiral spring 56 on the end of said stem to force valve member 58 on to its seat thereby blocking passage between sump 43 and the bore 46 of cylinder 42 as shown in Fig. 12, for instance. Movement of the cam 61 to the left will similarly move valve member 58 in the cylinder 41 and block passage between the sump and the bore 44 of said cylinder. In Fig. 12, the cam 61 is shown as moved to the right and the passage between the sump 43 and the bore 46 of cylinder 42 closed.

When the passage between the sump 43 and the bore of either cylinder 41 or 42 is closed, the oil or other fluid pumped by the pump 70 will be forced through the inlets 48 or 49 in to the closed bore of the adjacent cylinder and against the inner face of the piston member in said closed bore thereby forcing said piston outwardly of its cylinder. In Fig. 12, the piston 52 is shown forced outwardly of its cylinder because the passage between its bore 46 and the sump 43 is closed by the valve 58.

When moved outwardly the bushing 55 engages the pin 59 moving the valve stem 54 and valve 58 off its seat permitting the fluid to escape from the bore 44 and thus prevent further movement of the piston.

Normally when the steering mechanism is in neutral position such as shown in Fig. 20, the pump 70 is continuously pumping fluid by reason of its connection with the motor from the sump 43 through the sump outlet 43', attached flexible hose 70', pump inlet 86, to the pump passage 80. On one stroke of the pump piston 87, say for instance, a movement to the left as shown in Fig. 17, the piston sucks ball 81 off of its seat permitting the oil to flow from passage 82' into the pump chamber to the right of the piston. Upon its return stroke or movement the piston forces said oil through passage 82 thereby forcing ball valve 84, off its seat against the action of its spring and permitting the oil to flow out through nozzle 83, through hose 83' to the compression casing inlet 48 to the bore 44 of cylinder 41 and through passage 45 back to the sump 43 thereby completing a cycle.

When the pump piston 87 is moved in the opposite direction, say to the right as viewed in Fig. 17, this movement sucks the ball valve 81 which is positioned in the left of the pump chamber 79 off its seat thereby permitting oil to flow from the passage 80 to the pump chamber to the left of piston 87. Upon its return stroke or movement, the piston forces said oil through the passage 82 on the left side of pump casing 78 thereby forcing its ball valve 84 off its seat and permitting the oil to flow out through its outlet nozzle 83, through attached flexible hose 78' to the compression casing inlet 49 to the bore 46 of cylinder 42 and through passage 47 back to the sump 43 thereby completing a cycle.

When the passage leading from the bore of either cylinder to the sump 43 is closed, the oil instead of going around the cycle as just described will be forced against the piston in the closed cylinder thereby moving said piston outwardly of the cylinder casing, as for instance piston 52 of cylinder 42 as shown in Fig. 12, as described above.

When a piston is moved outwardly of its cylinder, its outer end engages the plate 34 of one of the flanges 33 on the end of sliding bar 32 which moves said bar 32 in either direction right or left as viewed in Fig. 4. Movement of the sliding bar 32 is imparted to the tie rod 17 through arms 17' fastened to the tie rod and positioned in the path of movement of the flanges 33. Each flange 33 has a spherical enlargement 33' formed on its outer surface to make a more positive engagement with the adjacent arm 17' and insure a positive engagement between the flange and arm in case of a slight disalignment of such parts. Movement of the tie rod of course moves the steering knuckles 16 and connected drum members 14 thereby turning the front road wheels 12 in the direction desired.

Movement of the steering knuckles 16 simultaneously imparts a backward or forward movement to the drag link 18 as viewed in Fig. 2; and movement of the drag link carries the socket member 19 along with it and because of the tendency of the drag link to move the socket 19 away from the lower ball end of pitman 20 it is necessary for the driver of the automobile to keep the hand wheel 29 moving in the same direction in order to keep the ball member 21 on the bottom of pitman 20 in engagement with the inner concaved walls of the socket 19 so that the bottom ends of the pitman 20 and the lever 72 will be spaced from each other as shown in Fig. 23, for instance, and so that said pitman and lever arm will retain their relative angular positions in order to keep the valve closed.

When the front road steering wheels have been turned sufficiently, the driver holds the hand wheel 29 and stops further movement thereof. There is still oil pressure in the closed cylinder however and the drag link 18 continues to move an appreciable distance carrying the socket member 19 along with it so that said socket moves relative to the pitman 20 which has been stopped from movement by the driver holding the hand wheel 29. Movement of the socket 19 relative to the pitman causes the plate member 74 to move the lever arm 72 into alignment with the pitman 20 which has ceased moving and thus causing said pitman and lever arm 72 to assume the neutral position of Fig. 20 thereby opening the valve and returning the same to neutral position so that the oil in the cycle including that particular valve will flow around without interruption.

The steering mechanism is now in normal neutral position again ready to steer the front road wheels in the desired direction.

By keeping the lower ball end 21 of pitman 20 in engagement with the inner wall members of socket 19, the valve is kept in closed position and in addition the driver is able to get "the feel of the road" because of the necessity for concentrating on keeping said engagement by the turning of the hand wheel manually.

In case the above described automatic power steering mechanism gets out of order, the present invention also contemplates mechanism for manually steering the automobile thus eliminating the necessity for repairing the automatic steering mechanism and eliminating loss of time in an emergency. This manually actuated mechanism comprises a rod 106 extending from the dash board 107 to a point adjacent the front axle. The rear end of the rod 106 is connected to a bell crank lever 108 pivotally mounted on a bracket 109 on the dash board. The bracket 109 is provided with a slot 110 to permit limited pivotal movement of the lever 108. The front end of rod 106 is connected to an arm 111 which is fastened to a transverse shaft 112 rockingly mounted in a bracket 113 on one of the side frames 10 of the chassis and in the casing 30. Connected to the shaft 112 at a point where it passes through the casing 30 and about the center of said casing is an arm 114 which extends over the top of the casing in a groove 115 formed therein to a point near the front wall of said casing where it pivotally supports a depending arm 116 formed with lateral hooked fingers 117. These fingers 117 are positioned below the free ends of pins 118 fastened to the lower ends of the brake shoes 97 and which extend outwardly and forwardly through elongated slots 119 formed in a plate 120 which is mounted on the front wall of the casing 30 and encloses the compartments 98 which house the brake shoes.

In use, when the rod 106 is moved by the hand lever 108 it rocks the shaft 112 which lifts the arm 116 and because of the interlocking connection of the fingers 117 with the pins 118 the brake shoes 97 will be lifted off of the sliding bar 32. When the brake shoes are off the sliding bar 32 there is nothing to prevent sliding movement of the bar and connected tie rod 17. The steering may then be accomplished by turning the hand wheel 29 which will transmit the necessary turning movement to the wheels 12 through the steering post 28, worm 27, gear segment 26, shaft 24, pitman 20, drag link 17 and connected tie rod 17 and knuckles 16 to the wheels.

In Fig. 34, is shown a modified arrangement for bringing the drive from the sliding bar 32 to the tie rod 17. In this arrangement an elongated lever arm 121 is pivoted at 122 to a bracket 123 mounted on the front axle 11 and extends rearwardly from said axle to a point beyond the tie rod 17. The arm 121 is disposed in the path of movement of the flange 33 of the sliding bar 32 so that movement of the bar is transmitted to said arm 121. The inner free end of the arm 121 is adapted to engage a collar 124 or the like fastened to the tie rod 17. It will be understood that when the sliding bar is moved to the right or left by the pistons as viewed in Fig. 34, the flange 33 of the bar 32 will move the pivoted arm 121 which because of its engagement with collar 124 will move the tie rod 17 which in turn moves the steering knuckle 16 and wheels 12.

Fig. 31 illustrates a modified arrangement for adjustably mounting the brake shoe 97. In this form, a shoe member 125 is mounted in the upper end of the compartment 98 and secured to said shoe and extending through a screw threaded opening in the upper wall of the compartment is a screw member 126 having a nut 127. If the brake shoe becomes worn or needs adjustment all that is necessary to do is to set up on the screw 126 and bring the shoe 125 into engagement with the top of the brake shoe to properly position the brake shoe relative to the sliding bar 32.

In Figs. 32 and 33 a modified arrangement for preventing the rocking shaft 99 from rocking is shown. On each shaft 99 adjacent the flange 33 of the sliding bar is fastened an arm 128 provided with a curved outer end 129 having a slanting outer face portion 130 with a knife edge. Movably supported on the inner face of the flange 33 is a disk member 131 which is provided with a central stem having a reduced portion forming a neck 132 and an enlarged portion or knob 133 which has a sliding fit in opening 134 formed in the inner face of the flange 33. The disk 131 is provided with a slanting peripheral edge 135 which conforms to the shape of the slanting face portion 130 of arm 128. The disk 131 is normally positioned so that its inner face is in engagement with the inner face of flange 33 and is held in such position by the end of the piston 52. When the disk is in such normal position, the long side of the outer curved end 129 is in engagement with the slanting peripheral edge 135 of the disk whereby the arm 128 is held up and with it the rock shaft 99, with its coacting brake shoe 97. When the flange 33 of sliding bar 32 is jerked away from the piston, for instance by a blow-out, the arm 128 will urge the disk member 131 away from the flange 33 to the position shown in Fig. 33 so that the arm 128 is allowed to drop downwardly until its knife edge engages the neck portion 132 of the stem thereby permitting the shaft 99 to rock and permits its coacting brake shoe 97 to engage the sliding bar 32 and prevent further movement thereof. In its downward position, the arm 128 extends downwardly beyond the edge of the wall of opening 134 in flange 33 and its knife edge engages the shouldered portion of the knob or enlarged portion 133 of the stem thereby preventing said stem and disk from becoming disconnected from the flange 33.

Changes in details of construction may be made without departing from the principle of the invention.

We claim:

1. In power steering mechanism for automobiles, a steering post, a motor, a casing having a reservoir for liquid, opposed cylinders formed on said casing, said casing having a passage between the bore of each cylinder and said reservoir, a pump driven by said motor for forcing liquid through said reservoir and cylinder bores, valve mechanism for controlling the flow of liquid through the bore of either cylinder including a valve member in each passage, means for actuating said valve member, a plunger in each of said cylinders adapted to be moved by passage of liquid in the cylinder bore outwardly of the cylinder, a sliding bar operatively connected to said plungers and a tie rod operatively connected to said sliding bar and to the front steering wheels, said valve actuating means including a cam member in engagement with each of said valve members, a lever arm connected to said cam member and linkage between the lever arm and the steering post whereby said lever arm is moved.

2. Power steering mechanism for automobiles as described in claim 1 in which the operative means of connection between the sliding bar and the tie rod is characterized by flanges on the sliding bar and flanges on the tie rod extending into the path of movement of the flanges on the bar and adapted to be engaged by the latter.

3. In power steering mechanism for automobiles, a steering post, a motor, a casing having a reservoir for liquid, opposed cylinders formed on said casing, said casing having a passage between the bore of each cylinder and said reservoir, a pump driven by said motor for forcing liquid through said reservoir and cylinder bores, valve mechanism for controlling the flow of liquid through the bore of either cylinder including a valve member in each passage adapted to open and close the passage, means for actuating said valve member to open and close the passage, a plunger in each of said cylinders adapted to be moved outwardly of the cylinder bore by passage of liquid therein when the valve member is in closed position, a sliding bar operatively connected to said plungers and a tie rod operatively connected to said sliding bar and to the front steering wheels and means associated with each valve member for automatically opening said valve member and preventing further movement of the plunger when said plunger moves a predetermined distance.

4. Power steering mechanism for automobiles as described in claim 3 in which the automatic means for opening the valve member and preventing further movement of the plunger is characterized by a pin on the valve member positioned in the path of movement of a stationary part of the plunger whereby said stationary part engages the pin and moves the valve member off its seat to open the passage.

5. In a power steering mechanism for automobiles, a motor, a steering post, a pitman arm connected to said post, a drag link, a lever arm pivotally connected at its center to the pitman arm and movable thereby and fixedly connected at one end to said drag link, a link rod connected at one end to the other end of said lever arm, a liquid pump driven by said motor, a casing having a liquid reservoir connected to said pump, opposed cylinders formed on said casing with their bores in communication with said reservoir, a plunger in each cylinder bore adapted to be moved outwardly of the bore by the pressure of liquid in said bore, a valve member in each bore for controlling the communication between each bore and the reservoir, a cam member for actuating said valve members operatively connected to the other end of said link rod, and lost motion means of connection between the pitman arm and drag link whereby movement of the pitman arm imparts movement to the pivotal lever arm for actuating said valve member to close the valve and whereby movement of the drag link relative to the pitman arm opens the valve.

6. Power steering mechanism for automobiles as described in claim 5 in which the lost motion means of connection between the pitman arm and drag link includes a socket member on the end of the drag link formed with a slot and a recess and a ball member on the end of the pitman arm in said recess and adapted to move longitudinally of the socket member.

7. In power steering mechanism for automobiles, a steering post, a motor, a liquid pump driven by said motor, a casing having a liquid reservoir, opposed cylinders formed on said casing, a passage between the bore of each cylinder and the reservoir, a plunger in each cylinder bore movable by the pressure of the liquid pumped into the bore through said passage and valve mechanism associated with each bore for controlling the flow of liquid through the passage to the bore and a cam faced rotatable disc operatively connected to the steering post for actuating said valve mechanism, said valve mechanism including an elongated stem extending outwardly of the plunger and through said passage and a conical valve member on the outer portion of said stem and adapted to block said passage, the end of the outer portion of said stem being adapted to be engaged by said disc for moving the valve member off its seat in said passage to permit liquid to flow therethrough.

8. In power steering mechanism for automobiles, a steering post, a motor, a liquid pump driven by said motor, a casing having a liquid reservoir, opposed cylinders formed on said casing, a passage between the bore of each cylinder and the reservoir, a plunger in each cylinder bore movable by the pressure of the liquid pumped into the bore through said passage, valve mechanism associated with each bore for controlling the flow of liquid through the passage to the bore, a cam faced rotatable disc operatively connected to the steering post for actuating said valve mechanism, said valve mechanism including a stem in the bore and protruding outwardly thereof, a conical shaped valve member on the outer portion of the stem in the passage, a spring for urging said valve member on its seat and a pin on the stem adapted to coact with said plunger to move the valve member off its seat upon the travel of the plunger a predetermined distance in the cylinder bore.

9. In power steering mechanism for automobiles, a steering post, a motor, a liquid pump driven by said motor, a casing having a liquid reservoir, opposed cylinders formed on said casing, a passage between the bore of each cylinder and the reservoir, a plunger in each cylinder bore movable by the pressure of the liquid pumped into the bore through said passage, said plunger being provided with an axial bore, valve mechanism associated with each bore to control the flow of liquid through the passage to the bore, a cam member operatively connected to the steering post for actuating said valve mechanism, said valve mechanism including a conical shaped valve member in the passage, an elongated stem having one end fastened to the valve member and its other end extending into the axial bore of the plunger, a spiral spring for urging said valve member on its seat and a pin radially positioned on the stem inside of the axial bore of the plunger in the path of movement of a stationary part of the plunger and adapted to be engaged by said part upon the travel of the plunger a predetermined distance.

10. In power steering mechanism for automobiles, steering knuckles, a tie rod connected to said knuckles, a slidable bar, a flange on each end of said bar adapted to engage the tie rod and move the latter, oppositely movable pistons normally in engagement with said slidable bar for moving the same laterally and mechanism for resisting the lateral movement of the slidable bar when said bar becomes disengaged from one of the pistons, said mechanism including a shaft rockably mounted in each flange of the bar, a brake shoe floatingly mounted adjacent the inner end of each shaft and adapted to engage the slidable bar to resist lateral movement thereof and interlocking means on the bar and shaft for preventing rocking movement of the shaft to normally hold the brake shoe adjacent the end of the shaft out of engagement with the slidable bar.

11. In power steering mechanism for automobiles, steering knuckles, a tie rod connected to said knuckles, a slidable bar, a flange on each end of said bar adapted to engage the tie rod and move the latter, oppositely movable pistons normally in engagement with said slidable bar for moving the same laterally and mechanism for resisting the lateral movement of the slidable bar when said bar becomes disengaged from one of the pistons including a shaft rockably mounted in each end flange, a brake shoe floatingly mounted adjacent the inner end of each shaft and adapted to engage the slidable bar to resist lateral movement thereof and interlocking means on the bar and shaft for preventing rocking of the latter normally to hold the brake shoe adjacent the end of the shaft out of engagement with the slidable bar including a plate member hinged to one end of the flange and having a slanting face and a plate member fast to the shaft with a slanting face adapted to coact with the hinged plate.

12. In power steering mechanism for automobiles, a motor, a liquid pump driven by said motor, opposed cylinders having pistons adapted to be moved by the liquid from said pump, a tie rod for steering the wheels, a slidable bar adapted to be moved by said pistons and mechanism for resisting the lateral movement of the bar when the front wheels meet with an obstruction including a pair of spaced and aligned rockable shafts, a brake shoe floatingly mounted adjacent the inner end of each shaft and engaged by said inner end for normally holding the shoe off of the slidable bar, a spring encircling each shaft for rocking the same to permit the shoe to move into engagement with the slidable bar and additional spring means for moving the shoe with a snap action.

13. In steering mechanism for automobiles, knuckles for steering the wheels, a tie rod connected to said knuckles, a slidable bar operatively connected to said tie rod for moving the same, oppositely movable pistons normally in engagement with said slidable bar for moving the same laterally, mechanism for resisting the lateral movement of the slidable bar when said bar becomes disengaged from one of said pistons including a rockable shaft normally held against rocking by interlocking means on the shaft and slidable bar, a brake shoe floatingly mounted adjacent the inner end of said rockable shaft and engaged by said inner end for normally holding the shoe out of engagement with the slidable bar, spring means for rocking said shaft and brake shoe into bar gripping position and additional means for holding the brake shoe out of engagement with the slidable bar to permit manual steering of the wheels.

14. In steering mechanism for automobiles, knuckles for steering the wheels, a tie rod connected to said knuckles, a slidable bar operatively connected to said tie rod for moving the same, oppositely movable pistons normally in engagement with said slidable bar for moving the same laterally, mechanism for resisting the lateral movement of the slidable bar when said bar becomes disengaged from one of said pistons including a rockable shaft normally held against rocking by interlocking means on the shaft and slidable bar, a brake shoe floatingly mounted adjacent the inner end of said rockable shaft and engaged by said inner end for normally holding the shoe out of engagement with the slidable bar, spring means for rocking said shaft and brake shoe into bar gripping position upon disengagement of the piston with the bar and additional means for holding the brake shoe out of engagement with the slidable bar to permit manual steering of the wheels including a manually operated lever, a link connected to said lever, a pin fastened to said brake shoe, and an arm member connected to said link and adapted to engage said pin for lifting the shoe off of the slidable bar and holding it off.

JOHN BARTHO.
JOHN T. ACKERSON.